UNITED STATES PATENT OFFICE.

MELVILLE F. COOLBAUGH AND ELWYN H. QUINNEY, OF RAPID CITY, SOUTH DAKOTA.

PROCESS OF PRODUCING SOLUBLE SALTS OF ALUMINUM.

1,170,418.  Specification of Letters Patent.  Patented Feb. 1, 1916.

No Drawing.   Application filed June 2, 1913. Serial No. 771,244.

*To all whom it may concern:*

Be it known that we, MELVILLE F. COOLBAUGH and ELWYN H. QUINNEY, citizens of the United States, and residents of Rapid City, in the county of Pennington and State of South Dakota, have made certain new and useful Improvements in Processes of Producing Soluble Salts of Aluminum, of which the following is a specification.

Our invention relates to improvements in processes for producing soluble salts of aluminum from kaolin and other silicious and argillaceous earths, rocks, or minerals containing no potash or not sufficient potash to make its extraction of commercial importance, in which compounds of aluminium exist in an insoluble form.

An object of our invention is to provide a simple process for producing aluminum sulfate, and one which is inexpensive.

A further object of our invention is to provide a process which is applicable to rocks, earths or minerals which are found in abundance, and which form therefore a convenient supply of raw material.

Other objects and advantages will appear in the following specification and the novel steps of the process will be particularly pointed out in the appended claims.

In carrying out our process we make use of kaolin or other rocks, shales, or clays. These are first crushed or ground to pass through an eighty mesh screen. The powdered material is then thoroughly mixed with gypsum or limestone, which has been previously crushed to the same fineness. The proportions of the argillaceous and silicious material, and the gypsum or limestone, will vary in accordance with the composition of the rock, earth or minerals. When gypsum is used, two and eight-tenths parts of gypsum, by weight, should be added to each one part of silica, by weight, contained in the kaolin or other rocks, clays or shales to be treated. If limestone is used, one and seven-tenths parts of limestone, by weight, should be added for each one part of silica by weight contained in the kaolin or other rocks, shales and clays to be treated.

In the treatment of substances, of the nature described above, which contain lime as one of their constituents, the amount of lime or gypsum to be added should be decreased by the amount which is already contained in the materials to be treated.

The mixture of the finely ground argillaceous materials and lime or gypsum is heated to incipient fusion, then cooled quickly and crushed to a powder. The powder is then leached with water containing sulfuric acid, in the proportion of three parts of sulfuric acid, by weight, to each one part of alumina, by weight. The alumina as aluminum sulfate is then separated from the solution by crystallization. If too little sulfuric acid is used the alumina will not be dissolved out fully and if too much sulfuric acid is used the lime will be brought down in such quantities as to interfere with the proper crystallization of the alumina from the solution. The yield of alumina is ordinarily from ninety-three to ninety-eight per cent. of that contained in the koalin and other rocks, shales and clays treated.

In the foregoing specification the specific examples are given by way of illustration only, and it will be understood that the proportions in which the various substances are brought together may vary without departing from the spirit and scope of the invention.

We claim:

1. The herein described process of producing soluble salts of aluminum from potash-free argillaceous and silicious rocks, earths or minerals containing insoluble compounds of aluminum, which consists in reducing the rocks, earths or minerals to a powdered form, mixing therewith limestone in approximate proportions of one and seven-tenths parts of limestone, by weight, to each one part of silica, by weight, contained in the rocks, earths or minerals, heating the mixture to incipient fusion, cooling quickly, leaching the product with dilute sulfuric acid, and separating the aluminum sulfate from the resulting solution, by crystallization.

2. The herein described process of producing soluble salts of aluminum from potash-free argillaceous and silicious rocks, earths, or minerals containing insoluble compounds of aluminum, which consists in reducing the rocks, earths, or minerals to a powdered form, mixing therewith limestone in approximate proportions of one and seven-tenths parts of limestone by weight to each one part of silica by weight contained in the rocks, earths, or minerals, heating the mixture to incipient fusion, cooling quickly, leaching the product with dilute sulfuric acid in the approximate proportions of three parts of sulfuric acid by weight to each one part of aluminum by weight, and separating the aluminum sulfate from the resulting solution by crystallization.

MELVILLE F. COOLBAUGH.
ELWYN H. QUINNEY.

Witnesses:
FRANK M. SORKHART,
CLEMENT L. PERRYMAN